Patented Mar. 18, 1952

2,589,253

UNITED STATES PATENT OFFICE 2,589,253

ALKYLATION OF AROMATIC COMPOUNDS

George L. Hervert, Berwyn, and Herman S. Bloch, Chicago, Ill., assignors to Universal Oil Products Company, Chicago, Ill., a corporation of Delaware No Drawing. Application January 30, 1946, Serial No. 644,441

6 Claims. (Cl. 260—671)

This invention relates to the reaction of alkylatable substituted benzenes with normally liquid olefins. It is more particularly concerned with the alkylation of alkyl benzenes containing at least one substitutable nuclear position with normally liquid olefins in the presence of a phosphoric acid catalyst.

The synthesis of alkyl aromatic compounds by the catalytic alkylation of aromatic compounds with olefins or their equivalents is a process of considerable importance in the petroleum and chemical industries. For example, the alkylation of benzene with ethylene to produce ethyl benzene, used in the manufacture of styrene, and the alkylation of benzene with propylene to produce cumene, which is used as a blending agent in aviation gasoline, have been widely practiced in recent years. Reactions of this type which employ normally gaseous olefins have been studied extensively and a number of substances have been found which act as catalysts therefor. The alkylation of aromatics with higher boiling normally liquid olefins is not as well known, but recently this type of reaction has assumed considerable importance in connection with the preparation of detergents and wetting agents of the alkaryl sulfonate type.

It is known that metal halides of the Friedel-Crafts type and certain mineral acids, such as sulfuric acid, will catalyze the interaction of benzene and other aromatic hydrocarbons with normally liquid olefins. However, these catalysts have certain disadvantages which limit their usefulness. Metal halides of the Friedel-Crafts type, such as aluminum chloride, form undesirable complexes and sludges with unsaturated and aromatic hydrocarbons which decrease the catalyst life and consume charging stock, thereby increasing the cost of the process. In addition, the sludge is highly corrosive and specially lined or alloy reactors must be used in processes employing this type of catalyst. When phenols are alkylated in the presence of aluminum chloride and similar compounds, there is a considerable loss due to the formation of addition compounds of an intermediate character which gradually resinify to produce heavy residues of little value. Sulfuric acid is difficult to regenerate and has a tendency to form stable emulsions with the reactants. Moreover, with sulfuric acid of sufficient strength to produce substantial yields of alkyl derivatives of phenols, there usually is an appreciable amount of sulfonation and tar formation.

We have discovered a catalyst for the alkylation of substituted aromatic compounds with normally liquid olefins which is substantially free from the difficulties encountered with previous catalysts. Our catalyst comprises a calcined composite of phosphoric acid and an adsorbent. Although it was known that these composites catalyzed the reaction between benzene or alkyl benzenes and normally gaseous olefins, the discovery that they effected the alkylation of substituted benzenes with normally liquid olefins was unexpected, because it was known that said composites did not catalyze the reaction between benzene and higher boiling, normally liquid olefins. In this respect our catalyst is significantly different from the prior art alkylation catalysts because the latter promote the alkylation of both benzene and substituted benzenes with normally liquid olefins, whereas our catalyst promotes the alkylation of only substituted benzenes when liquid olefins are employed. Our catalyst does not form sludge-like complexes with the reactants and thus the product is free from impurities. In addition, the catalyst of this invention retains its activity for longer periods of time thus permitting continuous operation without intermittent regeneration. Another advantage of calcined phosphoric acid-adsorbent catalysts is that they are easily handled and may be disposed as a fixed bed within a reactor.

In one embodiment our invention consists of a process for the alkylation of aromatic compounds which comprises contacting a substituted benzene containing at least one substitutable nuclear position with a normally liquid olefin at alkylating conditions in the presence of a phosphoric acid alkylation catalyst. In a more specific embodiment our invention consists of a process for the synthesis of hydrocarbons which comprises subjecting a mixture of an alkyl benzene containing at least one substitutable nuclear position and a normally liquid olefin, said mixture containing a molal excess of the alkyl benzene, to alkylating conditions in the presence of an alkylating catalyst comprising a calcined mixture of an acid of phosphorus and an adsorbent.

The catalysts that are used in our process comprise calcined mixtures of phosphoric acid and an adsorbent. The acid may constitute 80% or more of the catalyst mixture ultimately produced, and in most cases is over 30% by weight thereof. The acids of phosphorus which are most desirable in the manufacture of this catalyst are ortho, pyro, and tetra, although other acids of phosphorus may be used. Metaphosphoric possesses the lowest activity of this class of acids and its use is not contemplated as such, although a small amount of it may be present in the final catalyst. The materials which may be employed as adsorbents or carriers for the acid are materials of a predominantly siliceous character such as diatomaceous earth, kieselguhr, and artificially prepared silica, or materials of the class of aluminum silicates such as fuller's earth, bentonite, montmorillonite, and acid treated clays.

One method of preparing catalysts of this type comprises mixing about 30 to 80 parts by weight of a phosphoric acid with 20 to 70 parts of a finely divided and relatively inert adsorbent at a temperature of 120–200° C. to form a homogeneous pasty mass, extruding, molding or otherwise forming the paste into shaped particles, drying and calcining the particles at a temperature of 250–550° C., whereby the catalyst is dehydrated to a water content slightly lower than that required in the finished product, and treating the resultant material with superheated steam at about 250° C. to produce a catalyst of the desired water content. Variations of this procedure may be used to produce active alkylating catalysts and we do not intend to limit our invention to catalysts prepared only by this procedure.

Aromatic compounds utilizable in our process comprise substituted benzenes containing at least one substitutable nuclear position. This group of compounds includes alkyl benzenes such as toluene, xylene, and ethyl benzene; phenols such as monohydric phenol, resorcinol, and pyrogallol; halobenzenes such as chlorobenzene and bromobenzene, and thiophenols. Other alkylatable aromatic compounds which may be employed in our process comprise substituted benzenes such as chlorotoluene, in which the substituents are dissimilar. The preferred alkyl substituents should not contain more than about 2 carbon atoms because when the groups are larger, dealkylation of these groups occurs during the alkylation reaction accompanied by alkyl transfer and polymerization with a net result that the reaction is not clean-cut and that the products are not as uniformly desirable.

Olefinic hydrocarbons suitable for use in our process are those which are normally liquid and which contain from about 5 to about 24 carbon atoms. Single olefins, mixtures of olefins, or mixtures of olefins and other hydrocarbons may be charged to our process. Examples of these materials are tetradecene-1, propylene polymer or a selected fraction thereof, such as the tetramer fraction, and cracked petroleum fractions produced by the thermal or catalytic cracking of hydrocarbons. Particularly important types or olefins are those in which the double bond is in the 1- or 2- position, which are not branched or are only slightly branched, and which contain from about 6 to about 20 and preferably from about 8 to about 14 carbon atoms. These olefins may be used to alkylate substituted aromatic compounds in the presence of a phosphoric acid catalyst and the product may then be sulfonated and the resulting aryl sulfonic acids may be reacted with a base, such as sodium, potassium, calcium and ammonium hydroxides, to yield the corresponding sulfonates. The alkali metal sulfonates are particularly good wetting, emulsifying, and detersive agents.

Both the aromatic and the olefinic feed stocks should be free from ammonia and organic nitrogen bases because these materials react with the phosphoric acid in the catalyst and lower its activity. When these impurities are present in the feed in sufficient quantities to seriously impair the life of the catalyst, they should be removed by a water wash. Acid water with a pH of 5 is most effective.

In the operation of our process it is essential to maintain a substantial molal excess of the aromatic compound over the olefin in the alkylation zone. This ratio should be at least about 4 to 1 and may be as high as about 40 or 50 to 1. When the aromatic to olefin ratio is less than about 4 to 1, the yield of primary alkylate is low and the consumption of aromatics and olefins is high because of side reactions such as polymerization, depolyalkylation, and the like. Furthermore, when our process is conducted at low ratios, the fraction of the product containing the primary alkylate usually is contaminated with olefinic substances produced by the aforementioned side reactions. The presence of these materials in the primary alkylate fraction frequently can not be tolerated and additional treating steps must be resorted to to remove such substances.

The temperature at which our process is conducted should be in the range of from about 150° C. to about 375° C. At temperatures below this range, very little alkylation takes place and the olefins and the phosphoric acid form stable esters with a resulting softening of the catalyst. At temperatures above this range, side reactions such as depolyalkylation, hydrogen transfer, and cyclization are excessive. The result is that the alkyl groups added to the aromatic compound during the reaction usually contain fewer carbon atoms than the olefin. When the reaction is conducted within the specified temperature range, the bulk of the added alkyl groups contain the same number of carbon atoms as the olefin. The minimum pressure required will depend upon the physical characteristics of the charge stock and the temperature in the reaction zone. In general, the best yields are obtained when the reactants are in the liquid phase and accordingly, in the preferred operation, the pressure is adjusted to maintain liquid phase conditions in the alkylation zone. An additional advantage gained from this type of operation is that the liquid keeps the catalyst clean by washing off deposits of high molecular weight hydrocarbons which tend to become adsorbed on the catalyst surface.

Another important variable in our process is liquid hourly space velocity which is defined as the volume of total feed to the alkylation zone per hour, divided by the superficial volume of catalyst in said zone. The space velocity as thus defined should be in the range of about 0.1 to about 10. If the process is conducted at space velocities much below 0.1, the size of the reactor and the amount of catalyst required for a given throughput become prohibitive and, because of the increased contact time, there is more opportunity for side reactions to take place. At space velocities greater than 10, the yield of alkylate decreases rapidly with increasing space velocity.

In order to maintain the activity and strength of the catalyst during operation, it is necessary that there be substantially no net gain or loss of water by the catalyst. Over-hydration of the catalyst causes softening and structural weakness and leads to corrosion of the equipment. Under-hydration increases carbon formation with a resultant loss of activity. The hydration of the catalyst can be controlled by determining the water contents of the inlet and outlet reactor streams and then making the appropriate adjustment in the moisture content of the feed.

The process of our invention may be carried out in batch operation by placing a quantity of phosphoric acid alkylation catalyst in a reactor equipped with a stirring device, adding the aromatic, heating to a reaction temperature, slowly adding the olefin while mixing the contents of the reactor, cooling the products, and recovering the alkylate. However, the preferred method of operation is of the continuous type in which the catalyst is disposed as a fixed bed within a reactor and the reactants are continuously passed through the bed at alkylation conditions. The alkylate in the effluent is recovered and the unreacted materials may be separated and recycled to the alkylation step for further reaction. Sometimes, after a long period of continuous operation, the activity of the catalyst declines because of carbon formation. It is then necessary to remove the hydrocarbons from the reactor and regenerate the catalyst by passing an oxygen-containing stream, such as air, through the catalyst bed at elevated temperatures.

The following examples are given to illustrate our invention but they are not introduced with the intention of unduly limiting the generally broad scope of said invention. All of the runs given in these examples were made with a catalyst consisting of 3/16" extruded particles of a calcined mixture of phosphoric acid and kieselguhr which contained about 60% by weight of phosphoric acid. The reactor consisted of a 1¼" steel tube within an aluminum-bronze heating unit and contained 200 ml. of the catalyst. A mixture of an aromatic compound and a normally liquid olefin was passed downwardly through the catalyst bed at the conditions shown under the runs. The product was distilled and analyzed.

Example I

Runs 1 and 2 were made with benzene and toluene respectively; the alkylating agent comprised the 165–200° C. fraction of a Mid-Continent thermally cracked gasoline. Run 3 was made with toluene and the tetramer fraction of a propylene polymer. The operating conditions and results are given below.

| Run No. | 1 | 2 | 3 |
|---|---|---|---|
| Aromatic | Benzene | Toluene | Toluene |
| Olefin | 165–200° C. M. C. Gasoline | 165–200° C. M. C. Gasoline | Propylene Tetramer |
| Aromatic/Olefin Molal Ratio | 15.0 | 15.0 | 5.0 |
| Temperature, °C | 300 | 300 | 300 |
| Pressure, p. s. i | 800 | 800 | 800 |
| Liquid Hourly Space Velocity | 0.5 | 0.5 | 0.5 |
| Yield of Alkylate, per cent of Theoretical | 1.1 | 24.9 | 12.0 |
| Gals. of Alkylate/Bbl. of Olefin-Containing Hydrocarbon Charge | 0.13 | 3.05 | 6.42 |

A comparison of the results of the first two runs shows that there was practically no alkylation of the benzene; whereas a substantial yield of alkylate was obtained from the toluene. Attempts to alkylate benzene with normally liquid olefins at other conditions of operation also were unsuccessful. A comparison of the last two runs shows that substituted benzenes can be alkylated with different types of olefins when a calcined mixture of phosphoric acid and an adsorbent is used as the catalyst.

Example II

The data given under runs 4, 5, and 6 show the marked effect of aromatic-olefin ratio on alkylate yield and quality.

| Run No. | 4 | 5 | 6 |
|---|---|---|---|
| Aromatic | Toluene | Toluene | Toluene |
| Olefin | 165–200° C. M. C. Gasoline | 165–200° C. M. C. Gasoline | 165–200° C. M. C. Gasoline |
| Aromatic/Olefin Molal Ratio | 2.0 | 15.0 | 35.9 |
| Temperature, °C | 300 | 300 | 300 |
| Pressure, p. s. i | 800 | 800 | 800 |
| Liquid Hourly Space Velocity | 0.5 | 0.5 | 0.5 |
| Yield of Alkylate, per cent of Theoretical | 4.5 | 24.9 | 42.1 |
| Bromine No. of Alkylate Fraction | 52 | 8 | 5 |

These data and others shown that at aromatic/olefin ratios below about 4 to 1, the alkylation is a minor reaction and the small quantity of alkylate that is obtained is contaminated with large quantities of olefinic hydrocarbons.

Example III

In runs 7, 8, and 9 phenol, chlorobenzene, and xylene were alkylated with a Trinidad 180–225° C. pressure distillate.

| Run No. | 7 | 8 | 9 |
|---|---|---|---|
| Aromatic | Phenol | Chlorobenzene | Xylene |
| Olefin | 180–225° C. Trinidad P. D. | 180–225° C. Trinidad P. D. | 180–225° C. Trinidad P. D. |
| Aromatic/Olefin Molal Ratio | 12.0 | 10.0 | 15.0 |
| Temperature, °C | 275 | 285 | 300 |
| Pressure, p. s. i | 500 | 600 | 800 |
| Liquid Hourly Space Velocity | 1.0 | 1.0 | 0.5 |
| Yield of Alkylate, per cent of Theoretical | 56.0 | 47.2 | 49.5 |

These results show that the substituent groups of the substituted benzenes employed in our process may be hydroxyl, halo, or alkyl.

We claim as our invention:

1. An alkylation process which comprises commingling an alkyl benzene having at least one substitutable nuclear position with a normally liquid monoolefin containing at least 8 carbon atoms per molecule in the molal ratio of alkyl benzene to olefin of at least 4 to 1, and subjecting the resultant mixture to the action of a calcined composite of a free acid of phosphorus and a siliceous adsorbent at a temperature of from about 150° C. to about 375° C., a liquid hourly space velocity of from about 0.1 to about 10, and a pressure sufficient to maintain the alkyl benzene and olefin substantially in liquid phase.

2. The process of claim 1 further characterized in that said alkyl benzene is free of alkyl substituents containing more than 2 carbon atoms.

3. The process of claim 1 further characterized in that said alkyl benzene is toluene.

4. The process of claim 1 further characterized in that said alkyl benzene is xylene.

5. An alkylation process which comprises commingling and alkyl benzene having at least one substitutable nuclear position with a cracked hydrocarbon fraction containing monoolefins having at least 8 atoms per molecule in the molal ratio of alkylbenzene to olefin of at least 4 to 1, and subjecting the resultant mixture to the action of a calcined composite of a free acid of phosphorus and a siliceous adsorbent at a temperature of from about 150° C. to about 375° C., a liquid hourly space velocity of from about 0.1 to about 10, and a pressure sufficient to maintain the alkyl benzene and the olefin substantially in liquid phase.

6. The process of claim 5 further characterized in that the said alkylbenzene is toluene.

GEORGE L. HERVERT.
HERMAN S. BLOCH.

REFERENCES CITED

The following references are of record in the file of this patent:

UNITED STATES PATENTS

| Number    | Name          | Date           |
|-----------|---------------|----------------|
| 2,030,070 | Morrell       | Feb. 11, 1936  |
| 2,067,764 | Ipatieff      | Jan. 12, 1937  |
| 2,072,153 | Bruson et al. | Mar. 2, 1937   |
| 2,223,364 | Flett         | Dec. 3, 1940   |
| 2,232,117 | Kyrides       | Feb. 18, 1941  |
| 2,275,182 | Ipatieff et al. | Mar. 3, 1942 |
| 2,283,465 | Schaad        | May 19, 1942   |
| 2,290,211 | Schaad        | July 21, 1942  |
| 2,374,600 | Ipatieff et al. | Apr. 24, 1945 |
| 2,375,724 | Anderson et al. | May 8, 1945  |
| 2,382,318 | Ipatieff et al. | Aug. 14, 1945 |
| 2,393,526 | Flett         | Jan. 22, 1946  |
| 2,404,340 | Zimmerman     | July 16, 1946  |
| 2,447,599 | Schmerling    | Aug. 24, 1948  |

FOREIGN PATENTS

| Number  | Country       | Date           |
|---------|---------------|----------------|
| 464,752 | Great Britain | Apr. 19, 1937  |

OTHER REFERENCES

Sachanen et al., "High Temperature Alkylation of Aromatic Hydrocarbons." Ind. Eng. Chem., vol. 33, No. 12 (Dec., 1941), pages 1540-1544 (5 pages), page 1542 is especially pertinent.

Berry et al., "The Alkylation of Benzene, Toluene and Naphthalene." Jour. Amer. Chem. Soc., vol. 49 (Dec., 1927), pages 3142-8 (7 pages), page 3144 is especially pertinent.